United States Patent [19]
Satzler

[11] Patent Number: 5,505,274
[45] Date of Patent: Apr. 9, 1996

[54] SUSPENSION STRUCTURE FOR A CONTINUOUS TRACK MACHINE

[75] Inventor: Ronald L. Satzler, Princeville, Ill.

[73] Assignee: Caterpillar Inc., Peoria, Ill.

[21] Appl. No.: 311,667

[22] Filed: Sep. 23, 1994

[51] Int. Cl.$^6$ .................................. B62D 55/104
[52] U.S. Cl. ............................ 180/9.5; 280/104
[58] Field of Search .................... 180/9.5, 9.52, 180/9.54, 9.58; 280/104, 676, 683, 702

[56] References Cited

U.S. PATENT DOCUMENTS

| | | | |
|---|---|---|---|
| 3,010,530 | 11/1961 | Risk | 180/9.54 |
| 3,974,891 | 8/1976 | Persson | 180/9.44 |
| 4,166,511 | 9/1979 | Stedman | 180/9.5 |
| 4,582,153 | 4/1986 | Shinsen | 180/9.5 |
| 4,781,257 | 11/1988 | Gee et al. | 180/9.5 |
| 5,018,591 | 5/1991 | Price | 180/9.5 |
| 5,191,952 | 3/1993 | Satzler et al. | 180/9.52 |

Primary Examiner—Kevin T. Hurley
Attorney, Agent, or Firm—Kenneth A. Rhoads

[57] ABSTRACT

A continuous track machine has a superstructure and an undercarriage each having a supporting frame and first and second end portions. A suspension structure connects the superstructure to the undercarriage. The suspension structure attaches the superstructure to the undercarriage at three locations. A pair of resilient members are connected to a respective frame and an arm of the suspension structure and provides cushioning between the superstructure and the undercarriage.

12 Claims, 5 Drawing Sheets

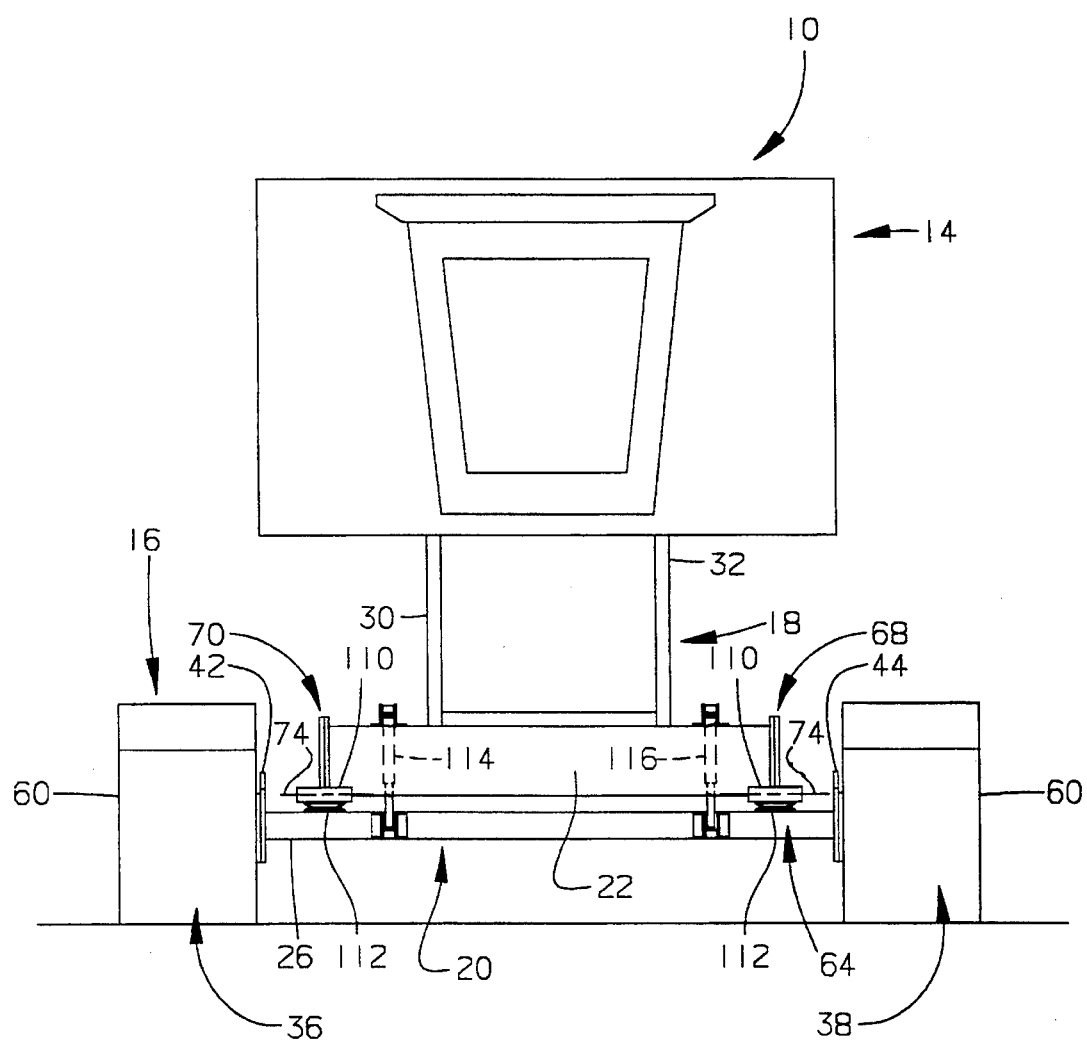

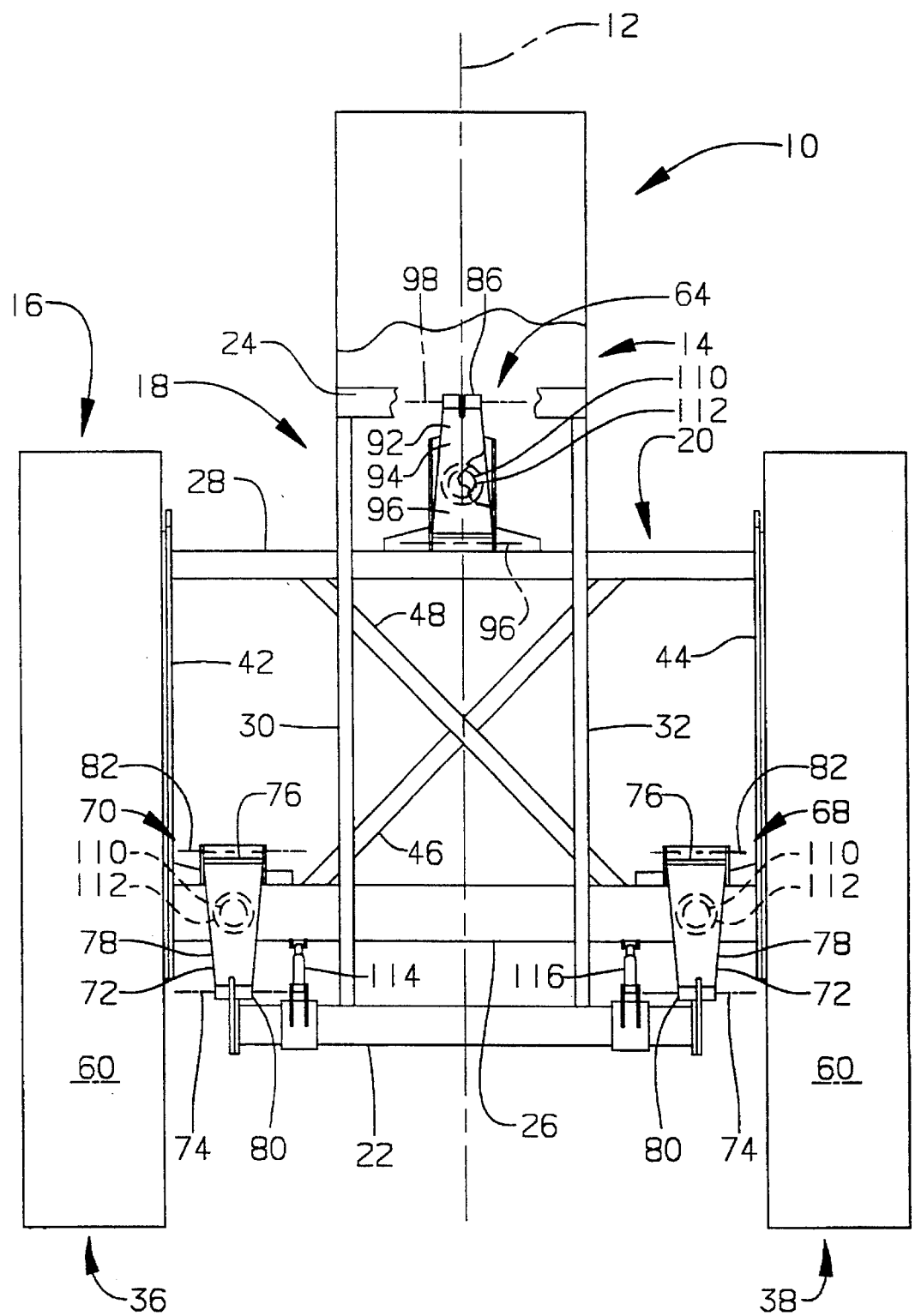
Fig_4_

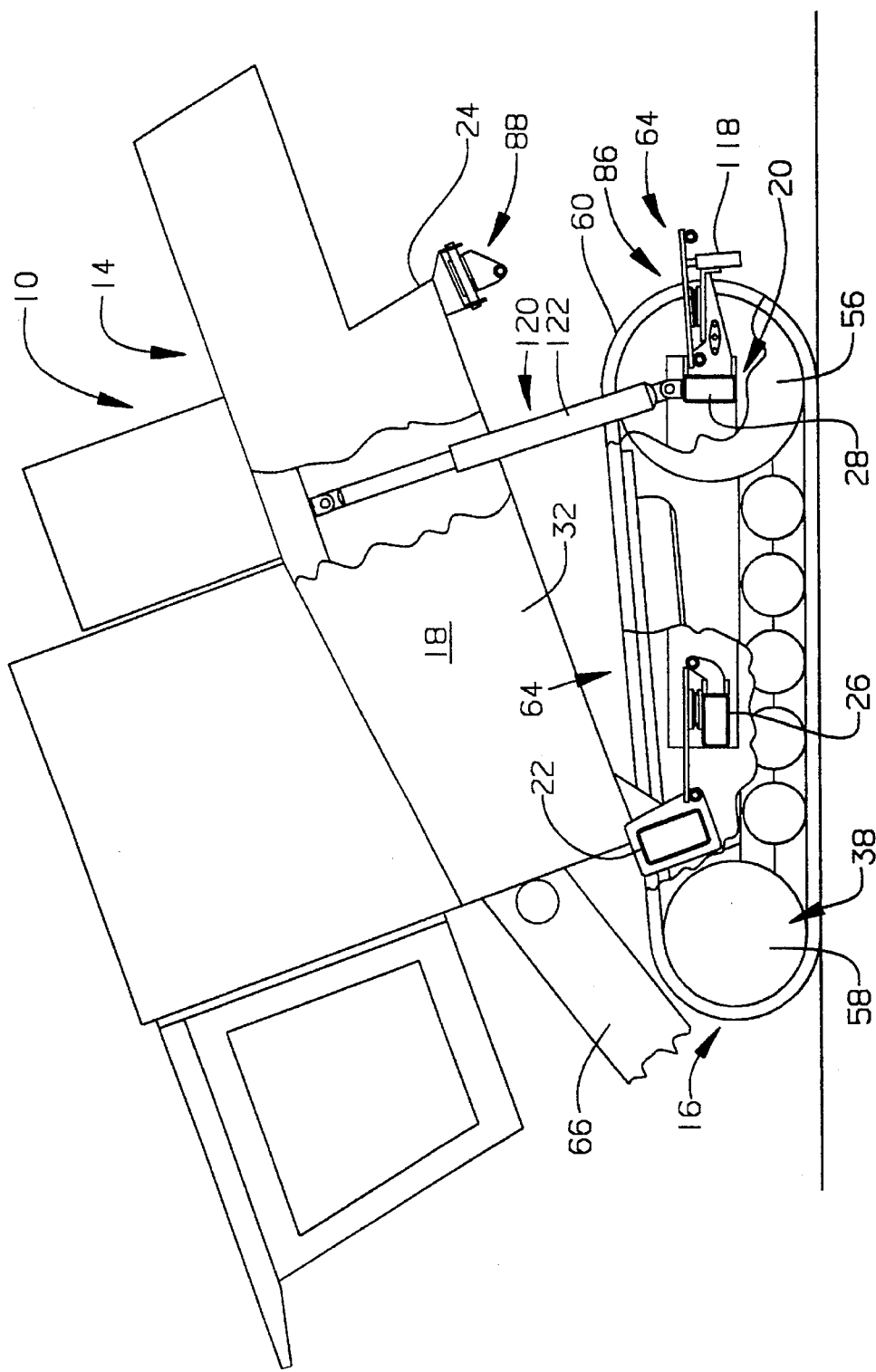

5,505,274

SUSPENSION STRUCTURE FOR A CONTINUOUS TRACK MACHINE

TECHNICAL FIELD

This invention relates generally to a continuous tracked machine such as a combine harvester, earthmoving machine or the like, and more particularly to the suspension structure therefor.

BACKGROUND ART

Track-type undercarriages, such as those individually having either a track chain or an elastomeric belt entrained about a drive wheel, are known to exhibit superior performance characteristics in certain respects over wheel suspension systems. These track-type undercarriages provide reduced ground pressure per unit area of contact and increased traction. Moreover, uneven and soft terrain vehicles equipped with track-type undercarriage have improved flotation and stability, and are more efficient than wheeled vehicles.

It has been found that many combine harvesters equipped with wheels could not be operated under wet and muddy conditions at the time the crop was ready to be harvested. In order to overcome this significant agricultural problem, it is desirable to replace the wheels with a belt-type undercarriage. This has enabled the combine to traverse safely over soft ground because the weight is more evenly distributed through the undercarriage and belt. Exemplifying this type of machine is U.S. Pat. No. 4,781,257 issued to Gee et al on Nov. 1, 1988 and U.S. Pat. No. 5,018,591 issued to Price on May 28, 1991.

Harvesters typically have a relatively light superstructure frame utilizing thin beams, diagonal braces, and plates. The superstructure can be subjected to relatively high dynamic twisting and bending forces as the machine moves over rough terrain.

Therefore, what is desired is a suspension structure for a tracked machine such as a combine harvester that eliminates twisting forces from being transferred up to the superstructure and to provide cushioning and damping for the superstructure.

The present invention is directed to overcome one or more of the problems as set forth above.

DISCLOSURE OF THE INVENTION

In one aspect of the present invention, a continuous track machine has a longitudinal axis, a superstructure and an undercarriage. The superstructure and undercarriage each having a supporting frame and first and second end portions. A suspension structure connects the superstructure to the undercarriage and includes, first and second connection members each attached to the first end portions of the first and second frames. Each of the first and second connection members have a connection arm, first and second connection end portions, and a connection middle portion. Each of the first and second connection members arms are pivotally connected at one end portion of the connection arm to the superstructure and at the other end portion of the connection arm to the undercarriage frame at respective locations spaced transversely and in opposed directions from the machine axis. The pivotal connections of the first and second connection arms each have a pivoting connection axis extending transverse the machine axis. A third connection apparatus is attached to the second end portions of the first and second frames and connects the superstructure to the undercarriage. The third connection apparatus has a clevis assembly connected to one of the undercarriage and superstructure frames. A third connecting apparatus arm has first and second apparatus arm end portions and an apparatus middle portion. The third apparatus arm is pivotally connected at one end portion to the other of the frame at a location substantially on said machine axis and is pivotally connected at the other end portion to the clevis assembly. Each of the pivot connections of the third connecting apparatus has a pivoting axis. The pivoting axis of the apparatus arm extending transverse the machine axis. The pivoting axis of the clevis assembly extending generally along the machine axis. A resilient member is positioned between one of the platform and the main frame and an arm.

BRIEF DESCRIPTION OF THE DRAWINGS

FIG. 3 is a diagrammatic front end view of the machine illustrated in FIG. 1 showing the suspension structure associated with the first end portion of the superstructure and undercarriage;

FIG. 4 is a diagrammatic top plan view of the suspension structure as taken along line 3—3 of FIG. 1 showing details of the suspension structure; and FIG. 5 is a diagrammatic side elevational view of the machine showing a moving member connected to the undercarriage frame and the superstructure frame for providing a force to pivot the superstructure frame relative to the undercarriage frame.

BEST MODE FOR CARRYING OUT THE INVENTION

Figure 1:
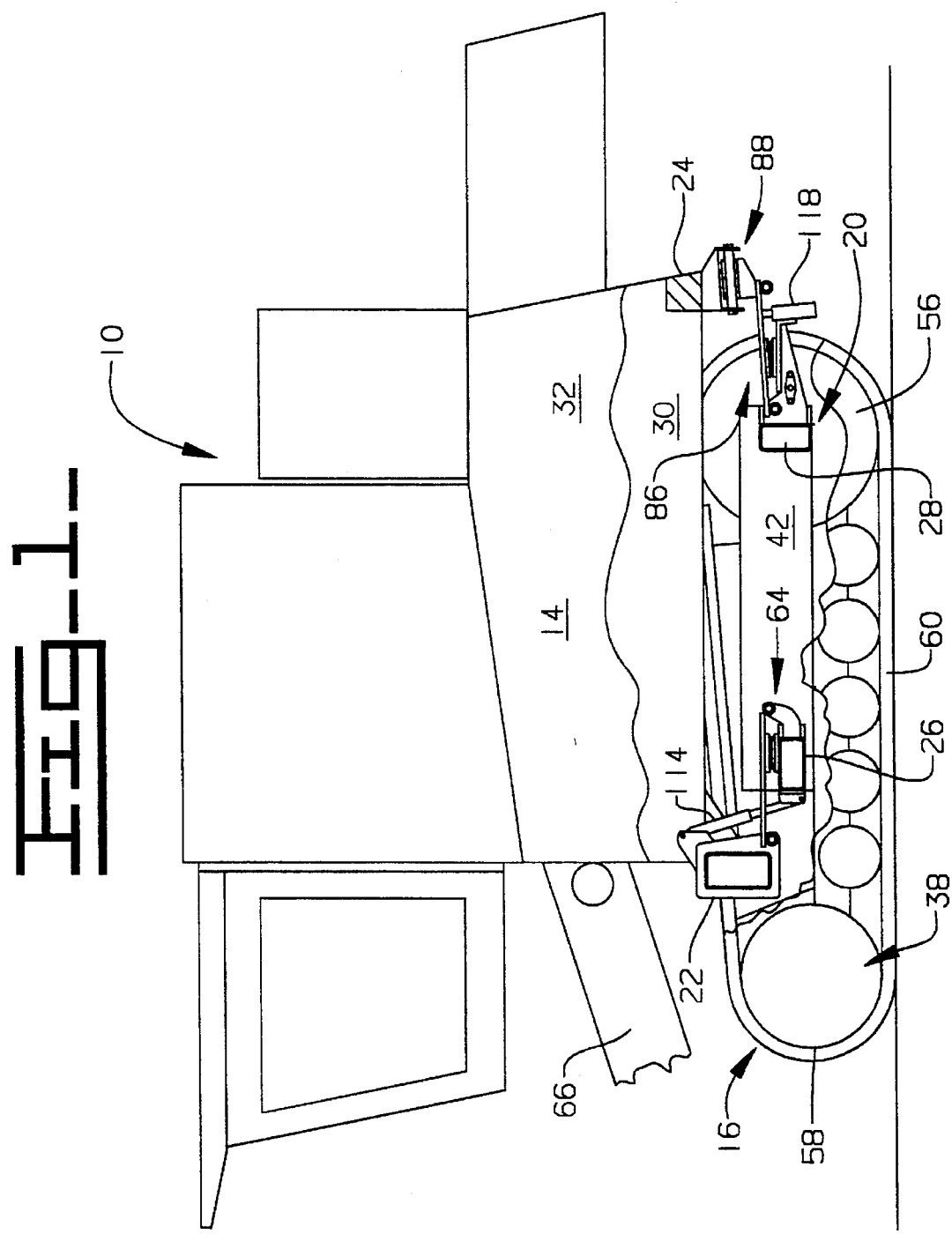
FIG. 1 is a diagrammatic side elevation view of a machine employing a suspension structure for a continuous track machine constructed in accordance with the present invention with portions broken open to better illustrate details thereof.

Referring to FIGS. 1, 2, 3, and 4 there is shown a continuous track machine such as a combine harvester machine 10 having a longitudinal axis 12, a superstructure 14 and an undercarriage 16. The superstructure 14 and undercarriage 16 each have a supporting frame 18 and 20 and first and second end portions 22, 24 and 26, 28 located respectively to the left and right when viewing FIG. 1. As best shown in FIGS. 3 and 4, the superstructure frame 18 further includes first and second opposed spaced apart parallel side members 30 and 32.

Figure 2:
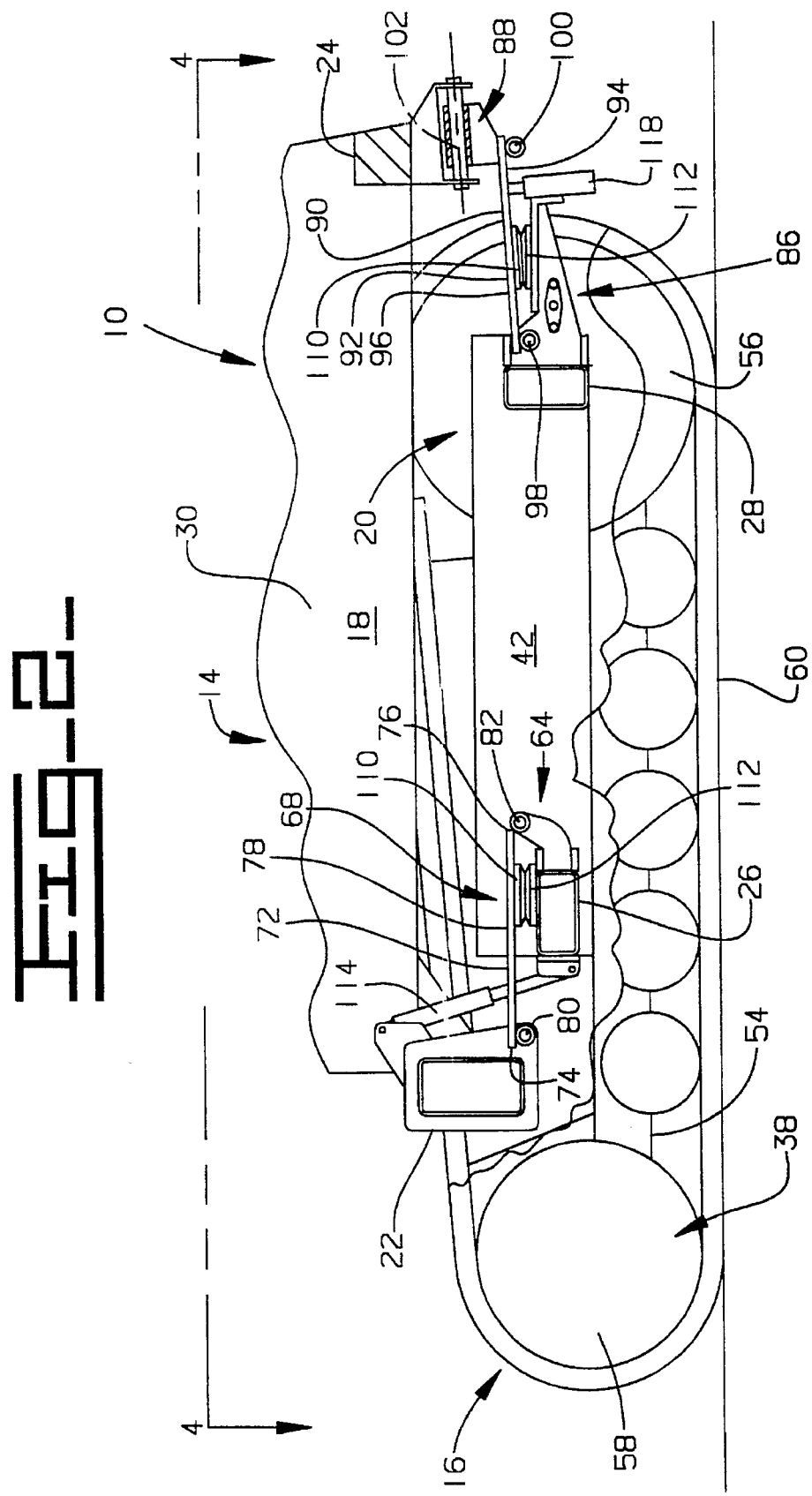
FIG. 2 is a diagrammatic and enlarged side elevation view of the undercarriage illustrated in FIG. 1 with a substantial part remove to better illustrate details of the suspension structure.

The undercarriage 16 is located generally elevationally below the superstructure frame 18 and includes similar right and left track roller frame assemblies 36 and 38. As best shown in FIG. 4, the undercarriage frame 20 further includes first and second opposed spaced apart parallel side plates 42 and 44 and a pair of diagonal braces 46 and 48. The undercarriage frame 20 is rigidly connected to each of the track roller frame assemblies 36 and 38 and provide a stable platform for the superstructure 14. The right and left hand track roller frames 36 and 38 are essentially mirror images of each other. As illustrated in FIGS. 1 and 2, each track roller frame assembly 36 and 38 includes a frame structure 54, a rear drive wheel 56 and a front idler wheel 58. The drive wheel 56 could be located at the front of the machine 10 and the idler wheel 58 could be located at the rear of the machine. The drive and idler wheels 56 and 58 are rotatably mounted on the frame structure 54 and a ground-engaging track or drive belt 60 encircles these wheels in the form of an endless loop in a well-known manner. Each drive wheel 56 is powered through a differential steering mechanism and other standard control mechanisms, which are well-known in the art.

A suspension structure 64 used in conjunction with the undercarriage 16 provides the sole support for the superstructure 14 of the combine harvester 10. The suspension structure 64 attaches the superstructure 14 to the undercarriage 16 preferably at three locations reducing the dynamic twisting forces transferred up to the superstructure from the undercarriage. As shown in FIG. 1, a conventional front-mounted harvesting implement 66, only a fragment of which is illustrated, is effective to gather the crop with forward movement of the machine 10. The crop is directed through a suitable threshing mechanism within the superstructure 14 in a well-known manner. It is to be understood that the harvesting mechanism itself could be of any suitable form, and that the depiction of the present invention within the context of a combine harvester is for purposes of example only, the invention also being adaptable to other forms of track-type or crawler vehicles.

As best shown in FIGS. 2 and 4, basically, the suspension structure 64 includes first and second connection members 68 and 70 each attached to the first end portions 22 and 26 of the superstructure frame 18 and undercarriage frame 20. The suspension structure 64 connecting the superstructure 14 to the undercarriage 16. Each of the first and second connection members 68 and 70 has a connection arm 72, first and second connection end portions 74 and 76, and a connection middle portion 78. Each of the first and second connection members arms 72 is pivotally connected at one end portion 74 of the connection arm to the superstructure 14 and at the other end portion 76 of the connection arm to the undercarriage 16 at respective locations spaced transversely and in opposed directions from the machine axis 12. The pivotal connections of the first and second connection arms 72 each having pivoting connection axes 80 and 82 extending transverse the machine axis 12.

A third connection apparatus 86 is attached to the second end portions 24 and 28 of the superstructure frame 18 and the undercarriage frame 20 and connects the superstructure 14 to the undercarriage 16. The third connection apparatus 86 has a clevis assembly 88 connected to one of the undercarriage 16 and the superstructure 14 frames 18 and 20. As clearly illustrated in FIG. 2, the clevis assembly 88 is preferably connected to the superstructure frame 18. A third apparatus arm 90 has first and second apparatus arm end portions 92 and 94 and an apparatus arm middle portion 96. The third apparatus arm 90 is pivotally connected at one end portion 92, 94 to the other of the frame 18, 20 at a location substantially on the machine axis 12 and pivotally connected at the other end portion 92, 94 to the clevis assembly 88. The end portion 92 has a pivot axis 98, the end portion 94 has a pivot axis 100, and the clevis assembly 88 has a pivot axis 102. The pivoting axes 98 and 100 of the third apparatus arm 90 extends transverse the machine axis 12 and the pivoting axis 102 of the clevis assembly 88 extends generally along the machine axis 12.

In the preferred embodiment as shown in FIGS. 2 and 4, there are a pair of resilient members 110 and 112, each connected to a respective frame 18, 20 and arm 72, 90. The arm 72, 90 connected resilient member 110 is pivotally moveable with the arm into contact with the other resilient member 112. The resilient member is adjustably connected to one of the frames 18, 20 and arm 72, 90. It is recognized that in another embodiment, a resilient member can be positioned between one of the frames 18, 20 and an arm 72, 90. In yet another embodiment, a plurality of separate resilient members can be positioned between one of the frames 18, 20 and a respective arm 72, 90. In still yet another embodiment, there can be three resilient members 106 each positioned between a frame 18, 20 and a respective arm 72, 90.

As best shown in FIGS. 2 and 4, the suspension structure 64 further includes damping means 114 and 116 each operatively attached to the first end portions 22 and 26 of the superstructure 14 and the undercarriage 16. The damping means includes first and second shock absorbers 114 and 116. The shock absorbers 114 and 116 are pivotally mounted adjacent the first and second connection members 68 and 70. In the preferred embodiment a third shock absorber 118 is attached between the second end portion 28 of the undercarriage frame 20 and the third apparatus arm 90. It is recognized that in another embodiment the third shock absorber 118 could be operatively attached between one of the frames 18, 20 and an arm 72, 90.

As illustrated in FIG. 5, the superstructure frame 18 is pivotally connected at the first end portion 26 to the first end portion 22 of the undercarriage frame 20. A moving member 120 is connected to the undercarriage frame 20 and the superstructure frame 18 for providing a force to pivot the superstructure frame relative to the undercarriage frame. The moving member 120 is a hydraulic cylinder 122.

INDUSTRIAL APPLICABILITY

With reference to the drawings, the subject continuous track machine 10 with the suspension structure 64 is particularly useful as an agricultural machine, such as a combine harvester. The belted frame assemblies 36 and 38 provide good traction and low ground pressure.

The suspension structure 64 used in conjunction with the undercarriage 16 supports the superstructure 14. The suspension structure 64 pivotally attach the superstructure to the undercarriage at three locations. The first and second connection members 68 and 70 attach the first end portions 22 and 26 of the superstructure frame 18 and the undercarriage frame 20. Each of the connecting arms 72 of the connecting members 68 and 70 have pivoting axes 80 and 82 that extend transverse the machine axis 12. The third connecting apparatus 86 attach second end portions 24 and 28 of the superstructure frame 18 and the undercarriage frame 30. The clevis assembly 88 of the third connecting apparatus 86 is connected to the superstructure frame 18 and the third apparatus arm 90 of the connecting apparatus 90 at a location substantially on the machine axis 12. The pivoting axes 98 and 100 of the third apparatus arm 90 extend transverse the machine axis 12 and the pivoting axis of the clevis assembly 88 extends generally along the machine axis 12. With the subject arrangement the superstructure frame 14 can pivot with respect to the undercarriage frame 20 along the longitudinal axis 12. There can also be rotation of the undercarriage frame 20 relative to the superstructure frame 14 about the pivoting axis 102 that extends generally along the machine axis 12. This rotation prevents twisting forces from being transferred up to the superstructure 14.

The resilient members 110 and 112 connected to the frame 20 and the arms 72 and 90 provide cushioning for the superstructure 14.

With the superstructure frame 18 being pivotally connected at the first end portion 22 to the first end portion 26 of the undercarriage frame 20 the superstructure 14 can be pivoted relative to the undercarriage frame 20 for service of the harvester as required. The superstructure 14 can be pivoted by a hydraulic cylinder 122 or other means connected between the superstructure frame 18 and the undercarriage frame 20.

Other aspects, objects and advantages of this invention can be obtained from a study of the drawings, the disclosures and the appended claims.

I claim:

1. A continuous track machine having a longitudinal axis, a superstructure and an undercarriage, said superstructure and undercarriage each having a supporting frame and first and second end portions, a suspension structure for connecting superstructure to the undercarriage comprising:

first and second connection members each attached to the first end portions of the first and second frames and connecting the superstructure to the undercarriage, each of said first and second connection members having a connection arm, first and second connection end portions, and a connection middle portion, each of said first and second connection members arms being pivotally connected at one end portion of the connection arm to the superstructure and at the other end portion of the connection arm to the undercarriage at respective locations spaced transversely and in opposed directions from the longitudinal axis, said pivotal connections of said first and second connection arms each having a pivoting connection axis extending transverse the longitudinal axis;

a third connection apparatus attached to the second end portions of the superstructure and undercarriage frames and connecting the superstructure to the undercarriage, said third connection apparatus having a clevis assembly connected to one of the undercarriage frame and the superstructure frame and a third apparatus arm having first and second apparatus arm end portions and an apparatus middle portion, said third apparatus arm being pivotally connected at one end portion to the other of said frame at a location substantially on said longitudinal axis and being pivotally connected at the other end portion to the clevis assembly, each of said pivoting connections of said connecting apparatus having a pivoting axis, said pivoting axis of the apparatus arm extending transverse the longitudinal axis and said pivoting axis of the clevis assembly extending generally along said longitudinal axis.

2. The suspension structure of claim 1 including a resilient member positioned between one of the frames and an arm.

3. The suspension structure of claim 1 including a plurality of resilient members each positioned between one of the frames and a respective arm.

4. The suspension structure of claim 1 including three resilient members each positioned between a frame and a respective arm.

5. The suspension structure of claim 1 including a pair of resilient members each connected to a respective frame and arm, said arm connected resilient member being pivotally moveable with the arm into contact with the other resilient member.

6. The suspension structure of claim 1 wherein the clevis assembly is connected to the superstructure frame.

7. The suspension structure of claim 5 wherein said resilient member is adjustably connected to one of said frame and said arm.

8. The suspension structure of claim 1 including a moving member connected to the undercarriage frame and the superstructure frame for providing a force to pivot the superstructure frame relative to the undercarriage frame.

9. The suspension structure of claim 8 wherein the moving member is a hydraulic cylinder.

10. The suspension structure of claim 1 including at least one damping means attached to the first and second frames.

11. The suspension structure of claim 10 wherein the damping means is a shock absorber.

12. The suspension structure of claim 10 including damping means attached between one of the frames and a respective arm.

* * * * *